UNITED STATES PATENT OFFICE.

JOHN HENRRY BAKER, OF CHICAGO, ILLINOIS.

PAINT.

SPECIFICATION forming part of Letters Patent No. 443,422, dated December 23, 1890.

Application filed December 12, 1889. Serial No. 333,390. (No specimens.)

*To all whom it may concern:*

Be it known that I, JOHN HENRRY BAKER, a subject of the Queen of Great Britain, and a resident of Chicago, in the county of Cook and State of Illinois, have invented a new and Improved Paint Compound, of which the following is a specification.

My invention is in the nature of a new paint compound; and it consists in the several ingredients mixed in the proportions, hereinafter described.

I take one hundred and fifty pounds whiting and mix it in ten gallons of water; then twenty pounds of glue and dissolve it in ten gallons of water. These two I then pour together, and in the same I dissolve one pound of powdered alum. I then take forty pounds of plaster-of-paris and mix in four gallons of water and add to the foregoing mixture. I then take twenty-eight pounds of drier, (litharge,) six hundred pounds white lead, and thirty gallons of linseed-oil, (half of which is boiled and half raw oil,) and mix the drier and white lead, and after being thoroughly mixed I add this last mixture to the first and stir until the whole is incorporated as a homogeneous mass, which remains a stable compound of a consistency ready to be applied with the brush. This paint is now white in color, but it may be given any desired tint by suitable colors.

This paint is thoroughly water-proof and weather-proof, and does not crack, blister, or become sticky with exposure to the sun or weather. It is a non-conductor, is not affected by frost, and does not oxidize. This paint is designed to be applied to any kind of material, either wood, iron, stone, brick, tile, plaster, paper, cotton or woolen cloth, leather, or any other substance, and when applied it covers perfectly and forms an impervious, smooth, and handsome enamel finish.

Having thus described my invention, what I claim as new is—

The paint compound herein described, consisting of whiting, glue, alum, plaster-of-paris, drier, white lead, linseed-oil, and water, mixed in or about the proportions described.

JOHN HENRRY BAKER.

Witnesses:
S. C. KEMON,
S. J. PAUL.